United States Patent [19]

MacDougall

[11] Patent Number: 4,549,257
[45] Date of Patent: Oct. 22, 1985

[54] VOLTAGE DOUBLER CIRCUIT

[75] Inventor: Frederick W. MacDougall, Marion, Mass.

[73] Assignee: Aerovox Incorporated, New Bedford, Mass.

[21] Appl. No.: 418,782

[22] Filed: Sep. 16, 1982

[51] Int. Cl.⁴ ............................................. H02M 3/18
[52] U.S. Cl. ..................................... 363/61; 361/275; 219/10.55 B
[58] Field of Search .............................. 363/59, 60, 61; 361/275; 219/10.55 B

[56] References Cited

U.S. PATENT DOCUMENTS

| | | | |
|---|---|---|---|
| 3,324,273 | 6/1967 | Ogburn | 219/10.55 |
| 3,377,562 | 3/1968 | Staats | 328/230 |
| 3,591,826 | 7/1971 | Valles | 219/10.55 |
| 3,651,371 | 3/1972 | Tingley | 315/102 |
| 3,666,964 | 5/1972 | Flynn | 307/109 |
| 3,684,978 | 8/1972 | Otaguro | 219/10.55 |
| 3,840,787 | 10/1974 | Grahame . | |
| 4,001,657 | 1/1977 | Robinson . | |
| 4,017,702 | 4/1977 | Harmon et al. | 219/10.55 B |

FOREIGN PATENT DOCUMENTS 568847 11/1957 Italy ..................................... 361/275

Primary Examiner—Peter S. Wong
Assistant Examiner—Anita M. Ault

[57] ABSTRACT

A voltage doubler circuit for providing half-wave direct current at a predetermined peak voltage level to a device, has a source of alternating current having a peak voltage lower than the predetermined peak, a first capacitance element in series with the device, at least one additional capacitance element, switching means for selectably connecting the additional capacitance element in parallel with the first capacitance element for providing different levels of current to the device, and a resistance element connected between the capacitance elements for causing a voltage buildup on the additional capacitance element when the additional capacitance element is not connected by the switching means, whereby the peak voltage across the switch is smaller than the predetermined peak voltage level; and the internal charging resistor and two capacitance elements form an integral wound capacitor.

6 Claims, 2 Drawing Figures

VOLTAGE DOUBLER CIRCUIT

BACKGROUND OF THE INVENTION

This invention relates to voltage doubler circuits for providing power to a device, e.g., a microwave oven magnetron, and to capacitors with internal resistors (for use, e.g., in such circuits).

In some such circuits, a selectable output power enables the oven to cook at different temperatures. In Harmon et al., U.S. Pat. No. 4,017,702, the power output is changed by switching resistances into the circuit.

Discharging a capacitor sometimes requires connecting a resistor to the capacitor. Grahame, U.S. Pat. No. 3,840,787, describes a capacitor with an internally connected discharge resistor.

SUMMARY OF THE INVENTION

In general, in one aspect, the invention features, in such a circuit for providing half-wave direct current at a predetermined peak voltage level, a source of alternating current having a peak voltage lower than the predetermined peak, a first capacitance element in series with the device, at least one additional capacitance element, switching means for selectably connecting the additional capacitance element in parallel with the first capacitance element for providing different levels of current to the device, and a resistance element connected between the capacitance elements for causing a voltage buildup on the additional capacitance element when the additional capacitance element is not connected by the switching means, whereby the peak voltage across the switch is smaller than the predetermined peak voltage level.

In preferred embodiments, the device is a magnetron of the type having an anode and a cathode, and there is a diode in parallel with the magnetron, the anode and cathode of the diode being connected respectively to the cathode and anode of the magnetron, whereby current can flow in one direction only through the diode and in the other direction only through the magnetron; the first capacitance element has one foil connected to one foil of the additional capacitance element, the other foil of the first capacitance element is connected to the device, the other foil of the additional capacitance is connected through the switching means to said device, and the resistance element is connected between the other foils, whereby the resistance element causes a voltage buildup on the additional capacitance when the additional capacitance is not connected to the device; there is a discharge resistor connected in parallel with the capacitance element for discharging the capacitance elements when the source of alternating current is disconnected; the capacitance elements and the resistance element are combined into an integral capacitor including a first electrode, a pair of second electrodes insulated from each other and from the first electrode, the second electrodes each cooperating with a portion of the first electrode to form respectively the first capacitance element and the additional capacitance element, and a resistor connected between the second electrodes; and the integral capacitor is of the wound type, the electrodes each comprising a conductive layer, the first electrode being separated from the second electrodes by a dielectric layer.

By keeping the peak voltage across the switch lower than the peak voltage delivered to the device, inexpensive, reliable switches and other components can be used and the circuit will be longer lived, or higher AC voltages can be used.

In another aspect, the invention features a capacitor of the wound type including first, second and third conductive sheets forming respectively first, second and third foils of the capacitor, a dielectric sheet between the first conductive sheet on the one hand, and the second and third conductive sheets on the other hand, the second and third conductive sheets being electrically insulated from each other, the second and third conductive sheets each cooperating with a portion of the first conductive sheet to form a capacitance element, and a resistance sheet connecting the second and third conductive sheets.

In preferred embodiments, the conductive sheets are metal foil, the dielectric sheet is paper, and the resistance sheet is carbon-loaded paper; and the capacitance elements have values of between about 0.4 and 0.6 microfarads and the resistance element has a value between about 500K ohms and about 50 megohms.

The capacitor, including the internal charging resistance, is inexpensive, reliable and simpler to use than interconnecting two discrete capacitors and a resistor.

Other advantages and features of the invention will be apparent from the following description of the preferred embodiment, and from the claims.

DESCRIPTION OF THE PREFERRED EMBODIMENT

We first briefly describe the drawings.

DRAWINGS

STRUCTURE

Figure 1:
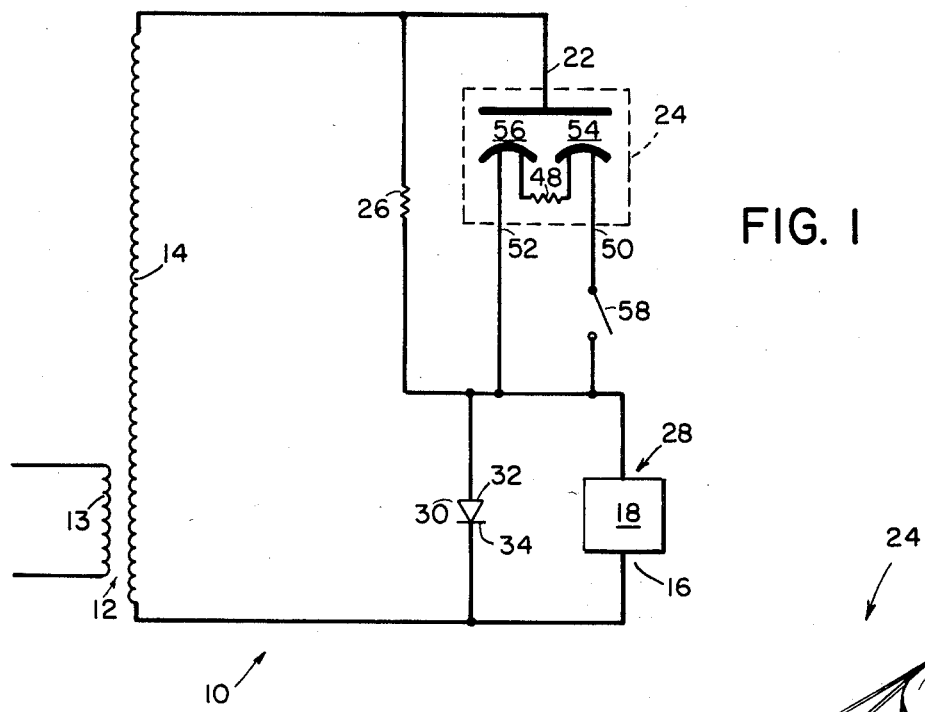
FIG. 1 is a schematic diagram of a voltage doubler circuit embodying the invention.

Referring to FIG. 1, half-wave voltage doubler circuit 10 has a transformer 12, primary winding 13 of which is connected to a 120-volt, 60-cycle power source, and secondary winding 14 of which is connected at one end to anode 16 of magnetron 18, and at the other end to terminal 22 of capacitor 24 and through discharge resistor 26 (e.g., 10 megohms) to cathode 28 of magnetron 18. Diode 30 is connected in parallel with magnetron 18 with the anode 32 and cathode 34 of diode 30 respectively connected to the cathode and anode of magnetron 18.

Figure 2:
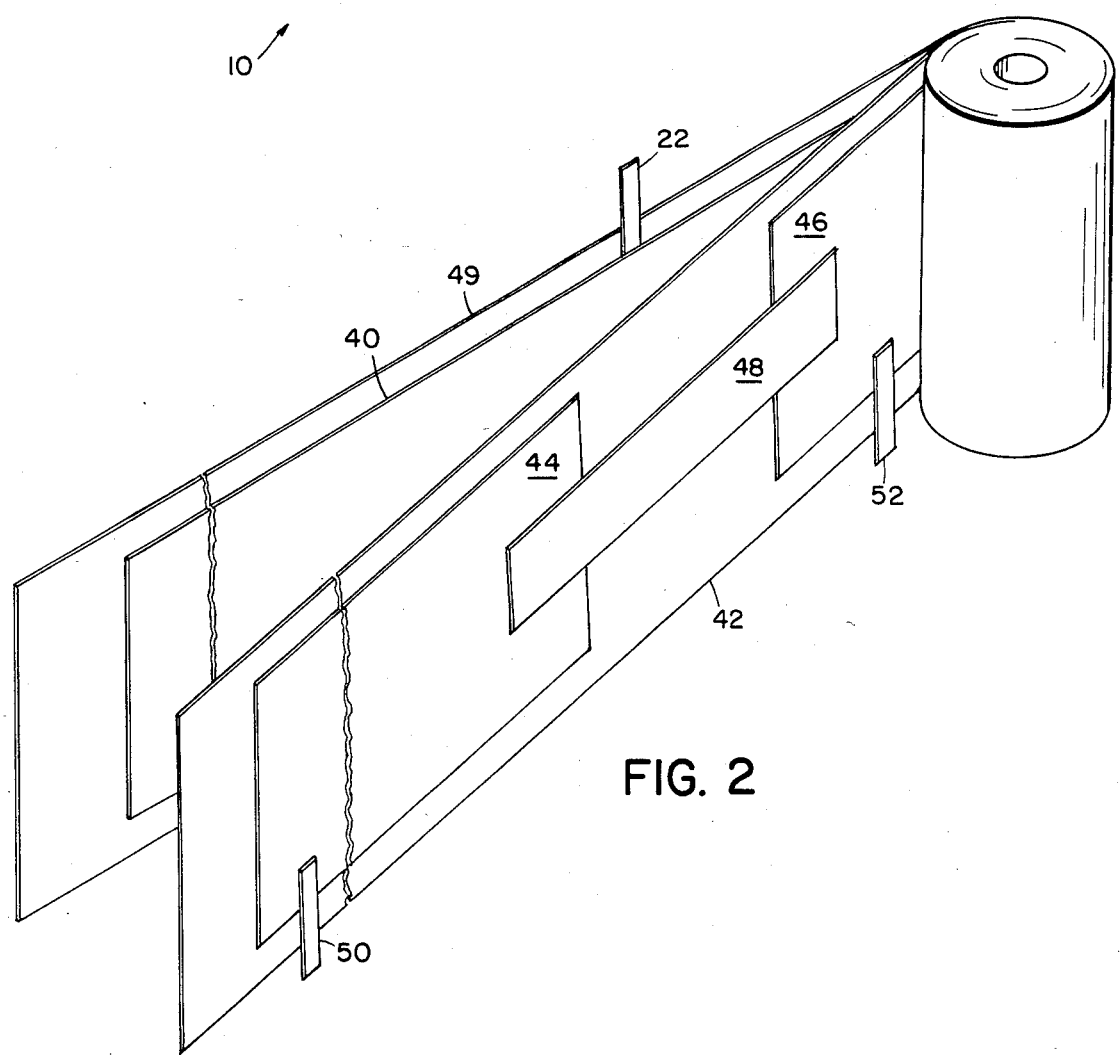
FIG. 2 is a partially broken away view of a capacitor, partly unrolled, embodying an internal charging resistor useful in the circuit of FIG. 1.

Referring to FIG. 2, in capacitor 24, terminal 22 is connected to a foil electrode 40, which is electrically insulated by a conventional dielectric paper sheet 42 from a pair of foil electrodes 44, 46. An internal charging resistor 48 of carbon-loaded paper has its ends overlapping (and therefore connecting) electrodes 44, 46. Dielectric sheet 42 and a second dielectric sheet 49 (on the other side of electrode 40 from electrodes 44, 46) insulate electrode 40 from electrodes 44, 46 and from resistor 48 when the capacitor is rolled into its finished form. Resistor 48 and terminal 22, and a pair of terminals 50 and 52 (connected respectively to electrodes 44, 46) are held in place by tightly winding dielectric sheets 42 and 49 and electrodes 40, 44, 46.

Referring again to FIG. 1, electrodes 40, 44 and electrodes 40, 46 form respectively a pair of capacitors 54, 56 (each having a value preferably between about 0.4 and 0.6 microfarads, most preferably 0.5 microfarads) with resistor 48 (having a value preferably between about 500K and 50 megohms, most preferably 10 megohms) connected in series with electrodes 44, 46. Capacitor 54 has an infinite effective impedance to DC voltage, but relatively small impedance (here 5.3K ohms) to 60-cycle AC current. Terminal 50 is connected through normally closed switch 58 to anode 32 of diode 30, and terminal 52 is connected directly to anode 28.

Including capacitors 54, 56 and resistor 48 in one integral unit assures lower cost, reliability and simplicity and eliminates interconnection of discrete capacitors and resistors which would otherwise be required.

OPERATION

With 120-volt, 60-cycle AC power delivered to transformer 12, secondary winding 14 delivers high voltage (e.g., 1200 volts) AC power to terminal 22. During positive half-cycles of the AC power, diode 30 is forward biased and conducts (but magnetron 18 does not), and capacitor 56 charges up to a voltage approximately equal to the peak voltage delivered from secondary winding 14, with the capacitor terminal 52 being at a negative potential relative to terminal 22. During negative half-cycles of the AC power, diode 30 is reverse biased and does not conduct, and the negative voltage already existing at terminal 52 together with the voltage from secondary winding 14 are together conducted through magnetron 18. Because capacitor 56 partially discharges during the negative half-cycles, the peak voltage supplied to the magnetron is somewhat less than twice the peak AC voltage supplied from secondary winding 14. Thus the circuit provides to magnetron 18 (through capacitor 56) half-cycle DC voltage pulses with a peak voltage of approximately twice (e.g., 1.75 times) the peak of the AC voltage delivered by secondary winding 14. The power delivered through capacitor 56 corresponds, e.g., to a particular cooking power in a microwave oven.

With switch 58 closed, additional power is delivered through capacitor 54 to magnetron 18 in the same way as described above for capacitor 56, so that the total power delivered to magnetron 18 produces a higher cooking power level in the oven. Resistor 48 is effectively shunted out of the circuit. Thus switch 58 serves to switch the cooking power between a lower level and a higher level.

With switch 58 open, capacitor 54 in series with resistor 48 together form a parallel current path to the path through capacitor 56. The voltage waveform at terminal 52 has both AC and DC components (because of the charging of capacitor 56) and a peak value of, e.g., 2100 volts, so that the voltage across the parallel current path formed by the series combination of resistor 48 and capacitor 54 has both AC and DC components. Because capacitor 54 has a relatively high impedance to DC power (compared with the resistance of resistor 48) a charge is trapped on capacitor 54 which keeps terminal 50 at the same DC voltage level as terminal 52. Therefore, with switch 58 open, the peak voltage difference between the terminals of switch 58 comprises only the AC component (which has a peak value of, e.g., 1200 volts) without the addition of the peak DC component (of, e.g., 900 volts), which would otherwise exist if resistor 48 were not in the circuit. Switch 58 (and other circuit elements) need not be capable of handling the full voltage peak of 2100 volts and can therefore be less expensive and more reliable than if the resistor 48 were absent from the circuit; alternatively higher AC voltage levels can be used in the circuit. Because the impedance of capacitor 54 to AC power is lower than the resistance of resistor 48, capacitor 54 makes no contribution to the power level at the magnetron, when switch 58 is open.

Referring again to FIG. 1, when power to circuit 10 is turned off and switch 58 is in its normally closed position, capacitors 54, 56 are discharged through resistor 26 to below 50 volts in less than a minute. Even with switch 58 open, discharging through resistors 26 and 48 to below 50 volts would take less than 5 minutes. During operation, the capacitors only discharge an inconsequential amount through resistors 26, 48 during a given half-cycle before being recharged.

Other embodiments are within the following claims. E.g., capacitors 54, 56 can be replaced by two discrete parallel capacitors, with a discrete resistor wired between terminals 50, 52; a discharge resistor (having a resistance at least 10 times that of resistor 48) can be wired in parallel with capacitor 54 in place of switch 58; additional capacitors can be wired in parallel with capacitors 54, 56 to provide additional power level steps; and an internal discharging resistance could be included within the integral capacitor package containing capacitors 54, 56 and resistor 48.

I claim:

1. A voltage doubler circuit for providing half-wave direct current to a device at different predetermined peak voltage levels, comprising a source of alternating current having a peak voltage lower than said predetermined peak voltage levels, a first capacitance element in series with said device, at least one additional capacitance element, switching means for selectably connecting and disconnecting said additional capacitance element in parallel with said first capacitance element to enable said alternating current source, said first capacitance element, and said additional capacitance element to provide said different predetermined peak voltage levels to said device, and a resistance element connected between said capacitance elements for causing a direct current voltage buildup on said additional capacitance element when said additional capacitance element is disconnected by said switching means, whereby the peak direct current voltage across said switching means is reduced prior to said additional capacitance element being connected by said switching means.

2. The improvement of claim 1 wherein said device is a magnetron of the type having an anode and a cathode, and further comprising a diode in parallel with said magnetron, the anode and cathode of said diode being connected respectively to the cathode and anode of said magnetron.

3. The improvement of claim 1 wherein said first capacitance element has one foil connected to one foil of said additional capacitance element, the other foil of said first capacitance element is connected to said device, the other foil of said additional capacitance element is connected through said switching means to said device, and said resistance element is connected between said other foils.

4. The improvement of claim 1, further comprising a discharge resistor connected in parallel with said first capacitance element for discharging said capacitance elements, when said source of alternating current is disconnected.

5. The improvement of claim 1 wherein said capacitance elements and said resistance element are combined into an integral capacitor comprising a first electrode, a pair of second electrodes insulated from each other and from said first electrode, said second electrodes each cooperating with a portion of said first electrode to form respectively said first capacitance element and said additional capacitance element, and a resistor connected between said second electrodes.

6. The improvement of claim 5 wherein said integral capacitor is of the wound type, said electrodes each comprising a conductive layer, said first electrode being separated from said second electrodes by a dielectric layer.

* * * * *